United States Patent [19]

Schildkraut et al.

[11] Patent Number: 5,058,970
[45] Date of Patent: Oct. 22, 1991

[54] QUASI-PHASE MATCHING OPTICAL WAVEGUIDE

[75] Inventors: Jay S. Schildkraut; Joseph F. Revelli, both of Rochester; Eric T. Prince, Fairport, all of N.Y.

[73] Assignee: Eastman Kodak Company, Rochester, N.Y.

[21] Appl. No.: 583,118

[22] Filed: Sep. 17, 1990

[51] Int. Cl.⁵ ............................................. G02F 1/37
[52] U.S. Cl. .................................. 359/328; 359/332; 385/3; 385/122; 385/129
[58] Field of Search ................................ 307/425–430; 350/96.12, 96.13, 96.14, 96.15, 96.29, 96.30, 96.34

[56] References Cited

U.S. PATENT DOCUMENTS 4,865,406  9/1989  Khanarian et al. .............. 350/96.12
4,971,416  11/1990  Khanarian et al. .............. 350/96.12

Primary Examiner—John D. Lee
Attorney, Agent, or Firm—Carl O. Thomas

[57] ABSTRACT

A quasi-phase matching optical waveguide for producing a second harmonic of an internally propagated polarized laser beam having a wavelength in the range of from 700 to 1300 nm is disclosed. The waveguide is comprised of at least one array of laterally spaced transparent electrodes in direct contact with a transmission medium containing similarly polar aligned organic molecular dipoles in overlying areas. The transparent electrodes and overlying areas of the transmission medium are each of the same width and spacing.

11 Claims, 3 Drawing Sheets

QUASI-PHASE MATCHING OPTICAL WAVEGUIDE

FIELD OF THE INVENTION

The invention relates to optical waveguides. More specifically, this invention relates to optical waveguides of the type used to convert a polarized laser beam to a frequency doubled (second harmonic) wavelength.

BACKGROUND OF THE INVENTION

This invention is an improvement on the quasi-phase matching optical waveguide disclosed by Khanarian et al U.S. Pat. No. 4,865,406.

The present invention shares with Khanarian et al the objective of providing a quasi-phase matching optical waveguide capable of converting polarized light from a laser to its second harmonic—i.e., doubling the frequency of the light being propagated through the waveguide.

Figure 1:
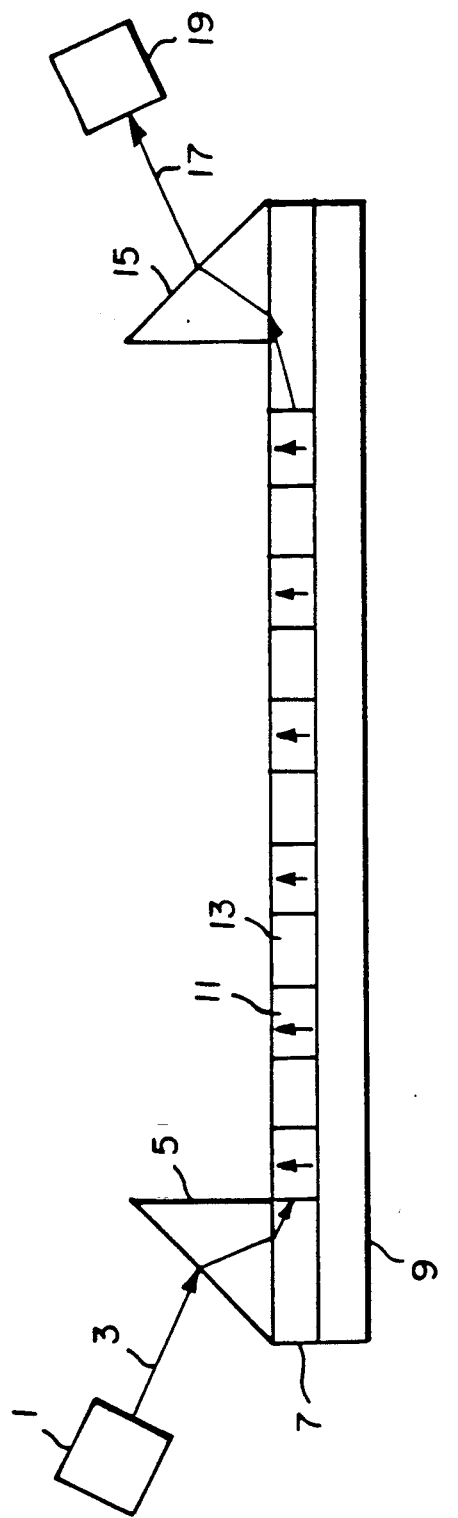
FIG. 1 is a schematic diagram of a quasi-phase matching optical waveguide showing features which the waveguide of the invention shares with prior art waveguides.

A schematic arrangement capable of satisfying this objective is schematically shown in FIG. 1. A laser source 1 is provided offering transverse magnetic (TM) polarized light having a wavelength in the range of from about 700 to 1300 nm. The light source is monochromatic—that is, confined to a single wavelength or narrow band of wavelengths. The laser beam 3 is directed through an optical coupling element 5 (shown as a prism) to an optically active layer unit 7 mounted on a support 9. In laterally spaced areas 11 indicated by vertical arrows the optically active layer unit contains organic molecular dipoles which are in polar alignment. In intervening areas 13 the organic molecular dipoles are either randomly oriented or exhibit a polar alignment opposite that of areas 11.

After passing sequentially through a plurality of areas 11 and 13, light passes through output optical coupling element 15 (shown as a prism) as indicated by arrow 17 to a conventional utilization apparatus responsive to the second harmonic (frequency doubled) component of the input light.

For efficient conversion of the input light to its second harmonic to occur it is essential that the light path in each of the areas 11 and 13 be of identical length and each equal to one coherence length ($l_c$). While Khanarian et al postulated this relationship and schematically illustrated it, Khanarian et al was unable to achieve this required relationship in the waveguides actually demonstrated.

Figure 2:
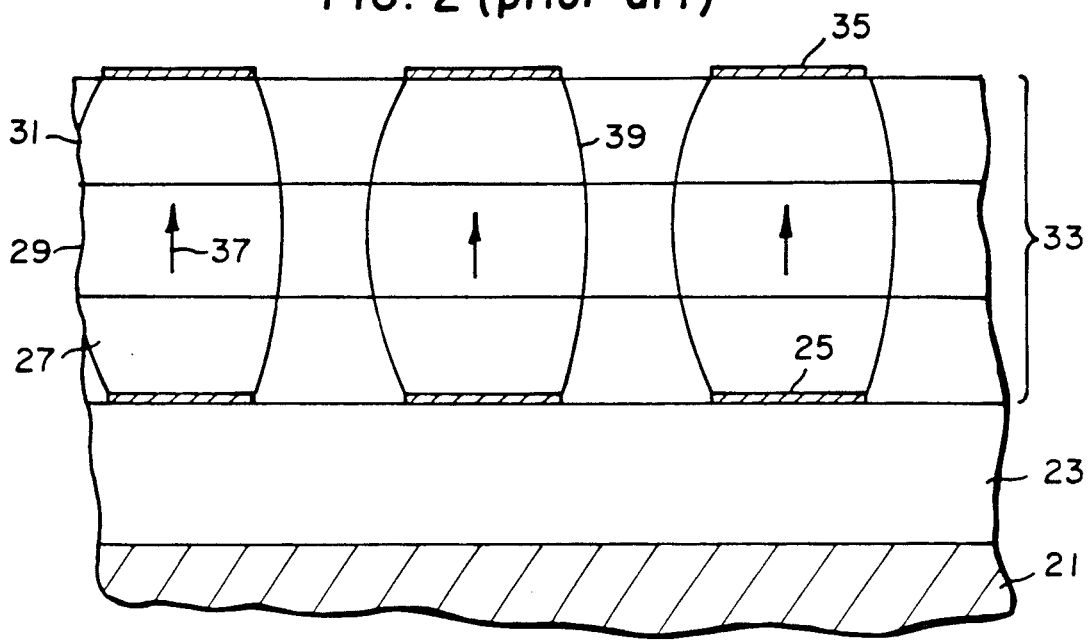
FIG. 2 is a cross-sectional view of a prior art conventional waveguide showing distortions in spacing attributable to field spreading.

The construction difficulties which Khanarian et al encountered are illustrated in FIG. 2. Referring to Example 1 of Khanarian et al, a silicon wafer 21 is shown provided with a silicon dioxide layer 23. On the silicon dioxide layer are formed a spaced lower array of aluminum electrodes 25, each 0.1 μm (1000 Å) in thickness.

Over the aluminum electrodes a 1.5 μm lower cladding layer 27 is coated. A nonlinear optically active organic layer 29 of 1.65 μm in thickness is coated over the lower cladding layer. An upper cladding layer 31 of 1.5 μm in thickness is coated over the optically active layer. The organic optically active layer 29, the lower cladding layer 27, and the upper cladding layer 31 together form an optically active layer unit. Overlying the upper cladding layer is an upper array of aluminum electrodes 35 having a thickness of 0.055 μm.

Even if it is assumed that Khanarian et al actually achieved the formation of lower electrodes 25 having a width of one coherence length ($l_c$) and spaced by a width of one coherence length, it does not follow that the width and spacing of areas in the optically active organic layer 29 adjacent the electrodes were also one coherence length in width and spacing.

Several difficulties are encountered in attempting to satisfy the performance characteristics sought by Khanarian et al with the construction of FIG. 2. To achieve polar alignment of organic molecular dipoles within the optically active layer in areas adjacent the electrodes as schematically indicated by arrows 37 Khanarian et al raised the temperature of the optically active layer unit to a temperature sufficient to allow freedom of movement of organic molecular dipoles contained in the organic optically active layer 29, thus producing organic layers with liquid properties. With organic optically active layer unit heated a potential difference was applied between the electrodes 25 of the lower array and the electrodes 35 of the upper array.

A first difficulty which is encountered with the construction of FIG. 2 is that the electrical field between the oppositely biased electrodes of the upper and lower arrays was not confined to areas of the organic optically active layer corresponding in width to the width of the electrodes. In other words, significant field spreading occurred, as indicated by boundaries 39. Within the boundaries the organic molecular dipoles exhibited polar orientation. However, because of lateral spreading of the electrical fields, the areas of the organic optically active layer which contain polar aligned organic molecular dipoles are much larger in width than intervening areas in which the organic molecular dipoles are not polar aligned, and neither the polar aligned areas nor the intervening areas correspond in width to electrode widths. Even if the electrodes were successfully fabricated to be one coherence length in width, as sought, then it is apparent that neither the areas of the organic optically active layer containing polar aligned organic molecular dipoles or the intervening areas of this layer are one coherence length in width.

A second difficulty is that the cladding layers increase the spacing between the electrodes, thereby reducing the potential gradient within the optically active layer. Only the potential gradient within the optically active layer contributes to polar alignment of the organic molecular dipoles. Therefore, higher potential biases must be placed across the electrodes when effecting polar alignment of the organic molecular dipoles or the degree of poling of the organic molecular dipoles will be reduced.

Another difficulty with the construction of FIG. 2 is that the electrodes 35 of the upper array are during heating and poling floating on underlying layers heated to exhibit liquid properties. The result is that the slightest touch or tilt of the device while heated can contribute to shifting the placement of one or more of the electrodes 35 on the organic layer unit laterally, destroying the coherence length spacing being sought.

SUMMARY OF THE INVENTION

The present invention overcomes a number of disadvantages exhibited by prior art quasi-phase matching optical waveguides. Most fundamentally, the present invention offers a more precise match between the width and spacing of areas of the organic optically active layer in which organic molecular dipoles are oriented in polar alignment and the width and spacing of electrodes of an underlying array. With the present invention the width and spacing of the polar aligned areas of the organic optically active layer are more precisely controlled.

In a specifically preferred embodiment of the invention the necessity of employing cladding layers is entirely eliminated. In addition to simplifying construction, this allows the entire potential difference used in poling the organic molecular dipoles to occur within the optically active layer, thereby increasing its internal potential gradient for a given applied electrical potential difference. It is also possible to entirely eliminate the upper electrode array, thereby obviating any concern about electrode shifting while poling organic molecular dipoles in the organic optically active layer.

In addition, in one preferred form the invention offers a very simple and advantageous approach for providing interleaved (i.e., interdigitated or alternated) areas of oppositely poled organic molecular dipoles within the organic optically active layer.

In one form the invention is directed to a quasi-phase matching optical waveguide for producing a second harmonic of an internally propagated polarized laser beam having a wavelength in the range of from 700 to 1300 nm comprised of means for providing at least a first array of electrodes with next adjacent electrodes being laterally spaced in the direction of propagation of the laser beam and organic layer means for propagating the laser beam containing organic molecular dipoles exhibiting a first polar alignment in areas overlying the electrodes of the first array to provide a second order polarization susceptibility in excess of $10^{-9}$ electrostatic units.

The waveguide is characterized in that the electrodes of the first array are in direct contact with the organic layer means and are chosen to exhibit a refractive index with an imaginary component of less than 0.1 and a conductivity at least 5 orders of magnitude higher than that of the organic layer means and the electrodes of the first array and the areas of the organic layer means exhibiting the first polar alignment each have the same width and spacing.

DESCRIPTION OF PREFERRED EMBODIMENTS

Figure 3:
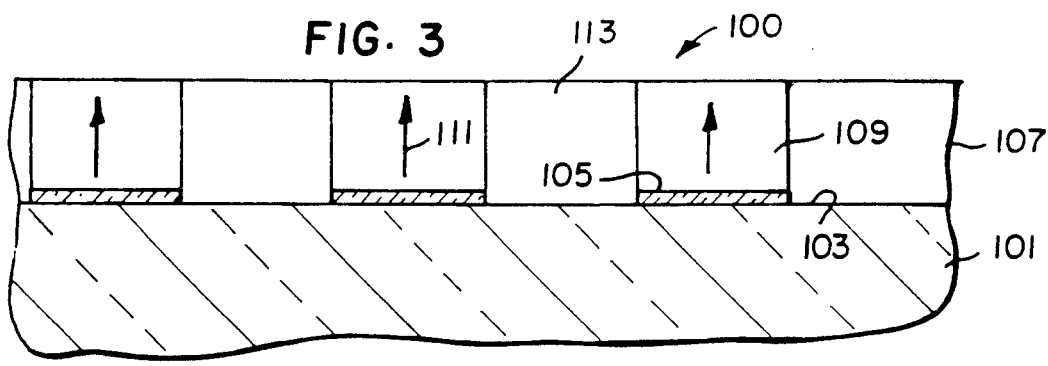
FIG. 3 is a cross-sectional view of a waveguide satisfying the requirements of the invention.

A quasi-phase matching optical waveguide 100 according to the invention is shown in FIG. 3. A transparent support 101, such as a glass or quartz substrate, has positioned on its surface 103 an array of electrodes 105 that each exhibit the same width and spacing from the next adjacent electrode. Contiguously overlying the surface 103 of the support and the electrode array is an organic optically active layer 107 containing organic molecular dipoles. The support 103 has a refractive index less than that of the optically active layer 107. The optically active layer is divided into a plurality of areas 109 each overlying one of the electrodes of the array and corresponding to the underlying electrodes in width and spacing. In each of the areas 109 the organic molecular dipoles are polar aligned, as indicated schematically by arrows 111. Areas 113 in which the organic molecular dipoles are not in polar alignment separate next adjacent areas 109.

Comparing the waveguide 100 of the invention with the prior art waveguide shown in FIG. 2, a number of differences are apparent. First, the waveguide 100 is simpler in construction, containing only one array of electrodes and no cladding layers. Second, there is a better correspondence between the width and spacing of the electrodes 105 and the areas 109 of the optically active layer containing polar aligned organic molecular dipoles.

Elimination of an array of electrodes overlying the optically active layer and a cladding layer separating the overlying array of electrodes from the optically active layer is made possible by placing a static electric charge on the upper surface of the organic optically active surface during poling while concurrently placing an opposite polarity bias on the electrodes 105. This places a voltage drop across the optically active layer in areas corresponding in width to the underlying electrodes. Field spreading, as shown in FIG. 2, is curtailed because the field gradient is applied across only a single layer as compared to three separate layers, which together approximately triple the distance between the biasing charge sources.

The elimination of a lower cladding layer separating the organic optically active layer and the underlying electrode array is made possible by specific selection of materials forming these electrodes. First and most fundamentally, the electrodes must, of course, be formed of a material having an electrical conductivity that is high in relation to that of the organic optically active layer. The electrodes 105 have a conductivity that is at least 5 orders of magnitude higher than that of the organic optically active layer, preferably the conductivity of the electrodes is at least 10 orders of magnitude higher than that of the optically active layer.

A second requirement of the electrodes 105 is that they must be formed to be compatible with guiding light in the organic optically active layer. While metals generally impart the required conductivity level for electrode construction, all metal electrodes must be excluded from consideration because of their creation of large optical losses within the waveguide. Electrodes 105 are formed of a material satisfying the above stated conductivity requirement and also exhibiting a refractive index compatible with efficiently guiding light in the optically active layer.

In considering the refractive index of an electrical conductor two components must be considered, the real component and the imaginary componenet. To confine light efficiently to the optically active layer it is preferred that the real component to the refractive index be less than the refractive index of the optically active layer. In this respect the selection of the material to form the electrodes is not different than selecting any of the various dielectric materials, including air, contacting the optically active layer, since a dielectric material can be thought of as having a refractive index consisting of a real component and an imaginary component which is essentially zero.

If the thicknesses of the electrodes are small—e.g., less than about 200 Å, the real component of the refractive index of the material forming the electrodes can be ignored. Even if the real component of the refractive index is higher than that of the optically active layer, thereby allowing a portion of the laser beam to enter the electrodes, the limited thickness of the electrodes insures that most of the laser beam will continue to be propagated within the optically active layer.

The imaginary component of the refractive index of the electrode forming material is important, since this controls absorption of light being transmitted within the optically active layer by the electrodes. A quantitative criterion for selection of a material for the electrodes 105 exhibiting a low light absorption is provided by the imaginary component (customarily assigned the subscript i) of the refractive index of the material. The electrodes of the waveguides of this invention which lie in direct contact with the organic optically active layer are chosen to exhibit a refractive index imaginary component of less than 0.1, preferably less than 0.01.

The waveguide 100 is an illustration of one preferred waveguide construction satisfying the requirements of the invention. Other waveguide constructions meeting the requirements of the invention are contemplated.

Figure 4:
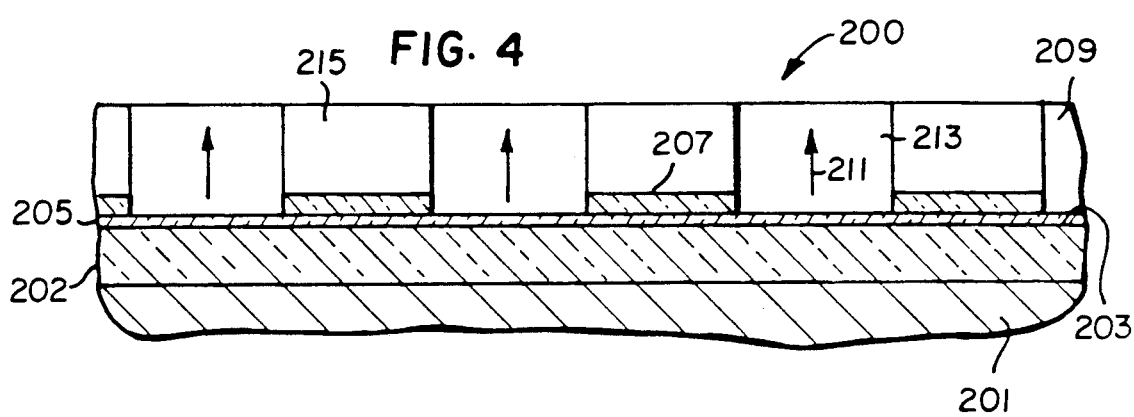
FIG. 4 is a cross-sectional view of an alternate embodiment of a waveguide satisfying the requirements of the invention.

An alternative waveguide construction is shown in FIG. 4. Waveguide 200 consists of a support shown having a base portion 201 and an optically transparent overlying portion 202. Located on the upper surface 203 of the overlying portion of the support is a conductive layer 205. Transparent electrically insulative segments 207 are located on the conductive layer. The insulative segments are laterally spaced by a distance equal to their width. Overlying and in direct contact with the insulative segments and the areas of the conductive layer lying between the insulative segments is an organic optically active layer 209. The organic molecular dipoles in the organic optically active layer are oriented in polar alignment, as indicated schematically by arrows 211, in areas 213 located between the insulative segments. In areas 215 of the optically active layer the organic molecular dipoles are not oriented in polar alignment.

Comparing the waveguides 100 and 200, it is apparent that the conductive layer 205 and insulative segments 207 together form a pattern of electrodes in direct contact with the optically active layer 209 in areas 213 between the insulative segments. The conductive layer 205 in areas of contact with the optically active layer must satisfy the same requirements as the electrodes 105 and is contemplated to be constructed from the same materials. The conductive layer 205 is shown as a continuous layer of uniform composition, since this is the most convenient form for fabrication; however, it is realized that the portions of the conductive layer underlying the insulative segments can be varied in composition or omitted entirely.

To minimize optical losses in the conductive layer 205 it is preferred that this layer be quite thin, typically less than 200 Å in thickness. However, such small thicknesses will not isolate the laser beam in the optically active layer 209 from the support. Therefore, when the underlying portion 201 of the support is formed of a material that would otherwise attenuate the laser beam being propagated, it is important to include the optically transparent overlying portion 202 of the support between the conductive layer 205 and the underlying portion 201 of the support. The overlying portion can conveniently take the form of a layer having thickness of about 1 $\mu$m or more, preferably at least 5 $\mu$m, in thickness. Alternatively, the entire support can be optically transparent, as described in connection with FIG. 1.

When the support portion 202 is constructed as indicated, the support portion 201 can be formed of any convenient material having the structural integrity to form a unitary substrate, including any electrically conductive, insulative or semiconductive material and any material that is either optically transparent, absorptive or opaque.

When the conductive layer is formed as shown as a continuous, uniform layer underlying the insulative segments, the electrically insulative segments are formed of materials that have a high resistivity (low conductance) as compared to that of the organic optically active layer. The reason for this is that during electrical biasing to bring the organic molecular dipoles into polar alignment the entire conductive layer is at one electrical potential level while the static charged surface of the organic optically active layer is at a second electrical potential. To restrict poling to areas 213 located between the insulative segments it is necessary that the insulative segments account for almost all of the voltage drop between the conductive layer and the charged surface of the optically active layer. A satisfactory division of the total voltage drop between each insulative segment and the overlying portion of the optically active layer in each area 215 can be achieved by forming the insulative segments of materials that have a resistance at least 2 orders of magnitude higher than (or a conductivity at least 2 orders of magnitude lower than) that of the material optically active layer. The relative resistances of the insulative segments and the overlying portions of the optically active layer are recognized to be a function of both relative resistivities and relative thicknesses.

Apart from the differences in features specifically discussed, the waveguide 200 offers essentially the same advantages over the waveguide of FIG. 2 as those described above in connection with waveguide 100.

In the waveguides 100 and 200 areas 109 and 213, respectively, are shown containing organic molecular dipoles in polar alignment interleaved with areas 113 and 215, respectively, in which the organic molecular dipoles are not oriented in polar alignment. Khanarian et al, cited above, schematically suggests constructing a waveguide in which adjacent areas of the optically active layer contain organic molecular dipoles in oppositely oriented polar alignments; however, no example or general guidance for producing such an arrangement is provided.

Figure 5:
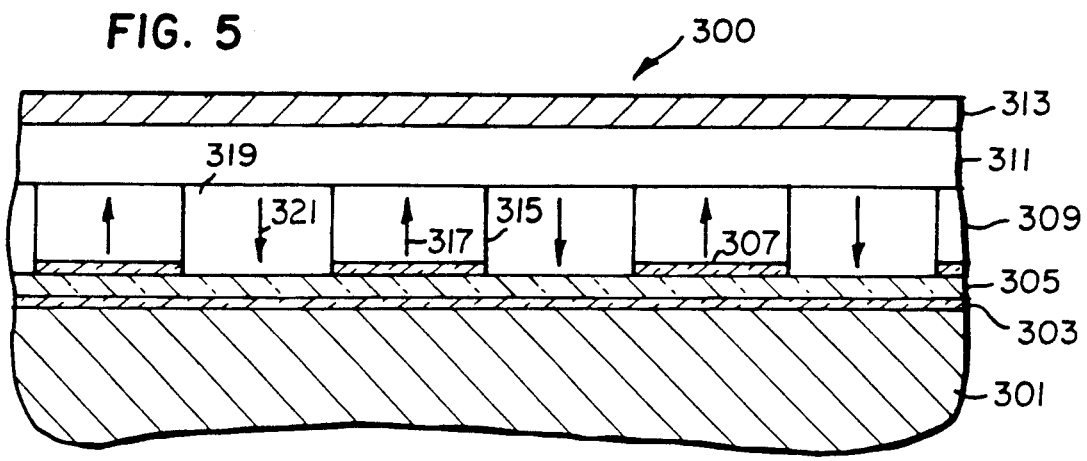
FIG. 5 is a sectional view of an additional embodiment of a waveguide satisfying the requirements of the invention.

The present invention specifically contemplates a waveguide in which interleaved areas of the optically active layer contain organic molecular dipoles in oppositely oriented polar alignment. An illustrative, practical construction, is shown in FIG. 5 in the form of waveguide 300. A support 301 is provided which can be formed of any convenient material (e.g., any material useful for fabricating support 201). An electrically conductive layer 303 is shown on the support. The electrically conductive layer 303 can take any convenient form, including, but not limited to, any form described above for conductive layer 203. Since the electrically conductive layer 303 need not directly contact the optically active layer, it is immaterial whether this electrically conductive layer is optically transparent. When the support 301 is electrically conductive, the conductive layer 303 can omitted, if desired.

Overlying the conductive surface provided by the conductive layer 303 (or the support 301 when constructed of a conductive material with layer 303 omitted) is an electrically insulative, optically transparent layer 305. The requirements described above for overlying portion 202 of the support are generally applicable to layer 305. Overlying the transparent insulative layer 305 are electrodes 307, which can be identical in their construction to electrodes 105 described above. Organic optically active layer 309 overlies and is in direct contact with the electrodes 307 and the intervening portions of the dielectric layer. Overlying the optically active layer is an insulative cladding layer 311 and an electrically conductive layer 313. When the electrically conductive layer 313 is formed of materials having the same properties as those useful in forming the electrodes 307, the cladding layer 311 is not required.

The organic optically active layer contains areas 317 overlying the electrodes 307 that contain molecular dipoles in polar alignment as schematically indicated by arrows 317. Between the areas 315 are areas 319 in which the organic molecular dipoles are also in polar alignment, but, as indicated schematically by arrows 321, in a polar alignment that is oriented opposite to that in areas 315. Each of the areas 315 and 319 are of equal width.

The waveguide 300 can be constructed by coating the conductive layer 303 on support 301 followed by coating the transparent insulative layer 305. Thereafter the electrodes 307 are formed on the transparent insulative layer, either by patterned depostion, or by forming a continuous conductive layer followed by patterned removal.

Next the organic optically active layer 309 is coated over the electrodes and the intervening portions of the transparent insulative layer. As coated the optically active layer is in a form in which the organic molecular dipoles contained therein have significant mobility. To impart polar alignment to the organic molecular dipoles in areas 315 a uniform static charge is imparted to the surface of the optically active layer and an opposite polarity electrical bias is placed on the electrodes 307. This creates a field gradient in the optically active layer that is confined to areas 315. Because the field gradient is confined to areas 315, the organic molecular dipoles in this region alone assume a polar aligned orientation, as indicated by arrows 317. With the electrical field applied, the organic molecular dipoles are permanently locked into their polar aligned orientation. This can be achieved, for example, by photopolymerizing or photocrosslinking the organic optically active layer selectively in the areas 315.

Once organic molecular dipoles in areas 315 have been permanently locked in a polar aligned orientation, oppositely orienting the organic molecular dipoles in areas 317 is simple, since the areas 315 necessarily define not only their own width and spacing, but also the width and spacing of the interleaved areas 317. Therefore, a variety of poling techniques can be employed, including those that would not be suitable for forming the areas 315 with the required width and spacing.

One approach for achieving a polar alignment in areas 319 which is the opposite that in areas 315 is to coat the upper surface of the optically active layer with the cladding layer 311 and then to coat conductive layer 313. By placing a potential gradient between conductive layer 313, serving as one poling electrode, and conductive layer 303 (or the support 301, when it is formed of a conductive material) the desired polar alignment of organic molecular dipoles in areas 319 can be realized. During this poling step the transparent insulative layer 305 and the cladding layer 311 both present resistances which are in series with the organic optically active layer. To place as much of the voltage drop between the conductive layers 303 and 313 as possible within the organic optically active layer so that it is available for aligning the organic molecular dipoles, the resistances of the cladding layer and the transparent dielectric layer are preferably kept to a minimum. To this end the transparent dielectric layer can be formed of an organic dielectric, such as a polymer, having a resistivity similar to that of the organic optically active layer. By keeping the thickness of the transparent dielectric layer below that of the optically active layer the resistance of the former can be further reduced in relation to the latter.

For a quasi-phase matching optical waveguide to be efficient in producing a second harmonic of the fundamental light frequency being propagated it is necessary for the light propagation path to traverse in the optically active layer one coherence length ($l_c$) in which the organic molecular dipoles are in polar alignment followed immediately by a second coherence length in which the organic molecular dipoles are not polar aligned or oppositely polar aligned. The coherence length ($l_c$) is defined by the following equation:

$$l_c = (\pi/\Delta\beta) \tag{I}$$

where
$\pi$ is 3.1416 and
$\Delta\beta$ is the propagation constant difference. The propagation constant difference is defined by the following equation:

$$\Delta\beta = |\beta(2\omega_1) - 2\beta(\omega_1)| \tag{II}$$

where
$\beta$ is the propagation constant of a mode (e.g., the zero order mode) and
$\omega_1$ is the fundamental frequency of the light being propagated.

It is not essential that the interleaved areas of the organic optically active layer each be exactly one coherence length in width and spacing for efficient conversion to the second harmonic frequency to occur. What is essential is that the width and spacing of the interleaved areas of the optically active layer each be equal. Once this relationship is satisfied the path of the light beam can be oriented in the optically active layer to the coherence length satisfying spacing.

Figure 6:
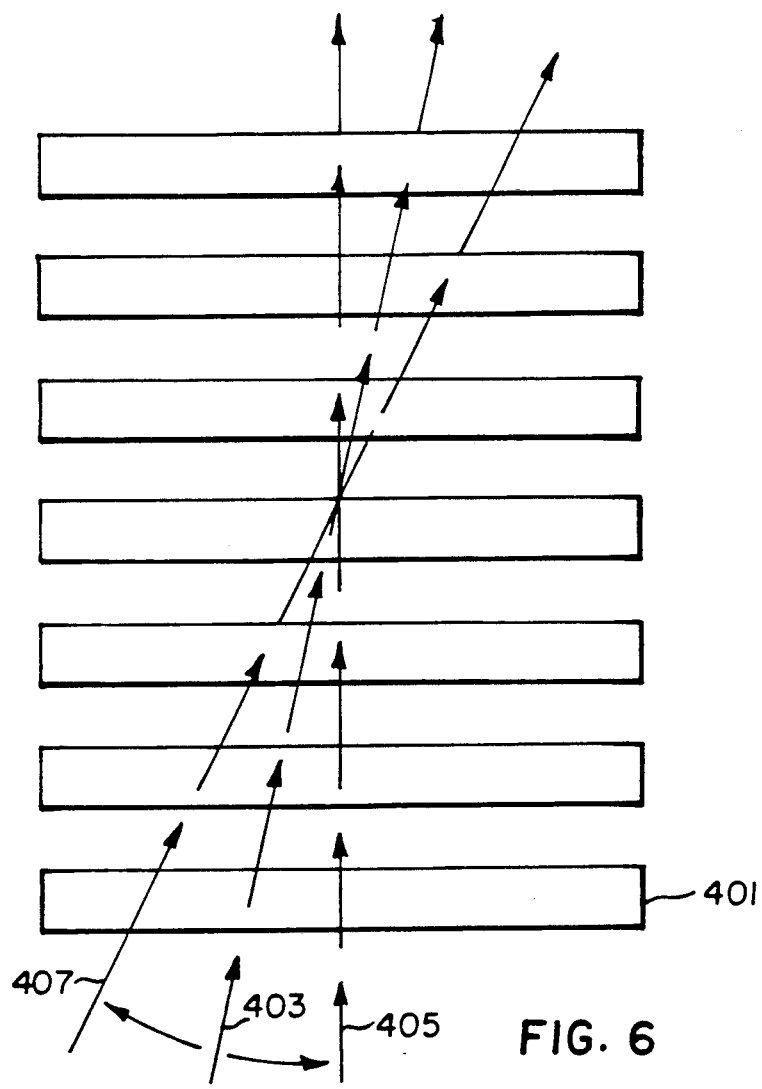
FIG. 6 is a plan showing the width and spacing of bars within the optically active area of a waveguide satisfying the requirements of the invention.

This is illustrated by reference to FIG. 6, wherein the bars 401 are of equal width and spacing and schematically represent areas within an optically active layer in which the organic molecular dipoles are arranged in one selected polar aligned orientation. When a light beam of a selected wavelength in passed through the organic optically active layer as indicated by arrows 403, the width and spacing of the bars may be slightly longer or shorter than one coherence length. By rotating the light beam clockwise toward the position indicated by arrows 405 the width and spacing or the bars as encountered by light beam can be reduced. By rotating the light beam counter-clockwise as indicated by arrows 407 the width and spacing or the bars as encountered by light beam can be increased. Thus, so long as the poled areas represented by bars 401 are of equal width and spacing the light beam can be efficiently converted to its second harmonic frequency even though the width and spacing of the poled areas does not exactly correspond to one coherence length. However, it should be noted that if the width and spacing of the poled areas are not equal, neither clockwise nor counter-clockwise rotation will produce optimum results.

The organic optically active layers of the quasi-phase matching waveguides can be constructed of any polymeric medium capable of exhibiting a high ($>10^{-9}$ esu) second order polarization susceptibility in areas containing polar aligned organic molecular dipoles containing an electron donor moiety linked through a conjugated $\pi$ bonding system to an electron acceptor medium. The organic molecular dipole can itself form a part of a polymer as a repeating unit in the polymer backbone or, more commonly, as a pendant group. Alternatively, the organic molecular dipole can be present as a separate compound physically blended with a polymer binder. The polymer portion of the layer can be either a linear or a crosslinked polymer. Conventional polymers as well as cladding layer, dielectric layer, support and other conventional waveguide component materials satisfying the requirements of the waveguides of the invention additionally including details of forming layers are taught by Scozzafava et al U.S. Pat. No. 4,946,235 and Scozzafava et al U.S. Ser. No. 419,819, filed Oct. 11, 1989 (now U.S. Pat. No. 4,955,977), commonly assigned, the disclosures of which are here incorporated by reference.

The materials forming the optically active layers typically exhibit resistivities of at least $10^{12}$ ohm-cm, with resistivities ranging two to three orders of magnitude higher (i.e., up to $10^{15}$ ohm-cm) being common. The organic optically active layer can be formed in any conventional thickness found in optically active waveguides capable of frequency doubling. Preferred layer thicknesses are in the range of from about 0.1 to 10 $\mu$m, optimally from about 0.5 to 3 $\mu$m.

The materials forming the electrodes lying in direct contact with the organic optically active layers are chosen from materials satisfying the conductivity and refractive index requirements discussed above. Because of the high resistivity levels of the materials forming the optically active layers very little current is conducted during poling. Thus, the electrodes, which are used only during poling, need sustain only very small current densities.

Conductive polymers constitute one contemplated class of materials for forming the electrodes lying in direct contact with the organic optically active layers. Conductive polymers and their properties are disclosed in the Handbook of Conducting Polymers, Vol. 1 and 2, Terje A. Skothem, editor, Marcel Dekker, Inc., New York, 1986, the disclosure of which is here incorporated by reference. Organic conductive polymers that rely on conjugated unsaturation for conductivity, such as polyacetylenes and polyenes, can absorb significant amounts of light in the visible spectrum. However, even polymers that appear to the eye to be deeply colored often lack chromophores capable of absorbing light at the longer infra-red laser wavelengths contemplated and can be selected also to exhibit little or negligible absorption in the wavelength range of the second harmonic. Polypyroles and polythiophenes and their derivatives are additional specifically contemplated classes of conductive polymers.

Polymers that are known to be useful in producing antistatic coatings can also be used as conductive polymers for forming the electrodes in direct contact with the optically active layers. Polyanilines of the type disclosed by Trevoy U.S. Pat. Nos. 3,963,498; 4,025,342; 4,025,463; 4,025,691; and 4,025,704, the disclosures of which are here incorporated by reference, can be selected for forming the electrodes lying in direct contact with the optically active layers. Phenazene polymers of the type disclosed by Ferrar et al EP 0 304 296 A3, here incorporated by reference, are also contemplated for use. Vinyl polymers with pendant ionic groups, such as provided by quaternized nitrogen atoms or sulfonic acid groups, of the type commonly used as dye mordants are known to be useful as antistatic coatings and can be used in the construction of the electrodes of the waveguides of this invention. Vinyl polymers with pendant ionic groups used to form antistatic coatings are illustrated by *Research Disclosure*, Vol. 158, June 1977, Item 15840; Vol. 162, October 1977, Item 16258; and Vol. 166, February 1978, Item 16630; the disclosures of which are here incorporated by reference. *Research Disclosure* is published by Kenneth Mason Publications, Ltd., Dudley Annex, 21a North Street, Emsworth, Hampshire PO10 7DQ, England.

The electrodes in direct contact with the optically active layers of the waveguides of this invention are preferably formed of a conductive metal oxide. Indium oxide ($In_2O_3$) and tin oxide ($SnO_2$) are specific examples of metal oxides. Indium tin oxide (mixed crystals of $In_2O_3$ and $SnO_2$, commonly designated ITO) constitutes a specifically preferred metal oxide electrode material because of its high conductivity and its low refractive index imaginary component (i). Typical preferred indium tin oxide compositions contain 5 to 20 percent indium oxide, on a molecular basis, based on indium and tin oxides.

Since indium tin oxide can be readily deposited in a form exhibiting a resistivity of less than $1 \times 10^{-2}$ ohm-cm, typically approximately $7 \times 10^{-3}$ ohm-cm, it is apparent that the conductivity of the indium tin oxide is more than sufficient in relation to that of the optically active layer to form an efficient electrode even in thin coatings. At a wavelength of 830 nm (n=1.941-0.001) electrode thicknesses can be translated into optical losses as follows:

| ITO Thickness in Å | Optical Loss (dB/cm) |
| --- | --- |
| 50 | 0.90 |
| 100 | 1.91 |
| 150 | 3.03 |
| 200 | 4.28 |
| 250 | 5.68 |

Preferred waveguides according to the invention contain electrodes in contact with the optically active layer that are formed of indium tin oxide and exhibit a thickness of less than 150 Å to 50 Å, optimally 125 Å to 75 Å.

EXAMPLES

The feasibility of the invention is demonstrated by the following:

An 18 weight percent solution of poly{4'-[N-(2-methacryloxyethyl-N-methylamino]-4-methylsulfonyl-stilbene-co-methyl methacrylate} (19:81 mole ratio) in 1,2,3-trichloropropane was prepared. The solution was spin-coated on a Pyrex TM substrate with a thin ITO grating with a grating constant of 11.6 μm. In other words, the ITO strips had a width of 5.8 μm and were separated by 5.8 μm spacings. The film was then baked overnight in a vacuum oven at 115° C. and 25 mtorr. The thickness of the film was 2.85 μm. The polymer was corona poled with a grid voltage of 350 volts for 1 hour at 108° C.

A 514.5 nm beam of an argon ion laser was guided in the film. The guided beam was not significantly attenuated as it passed through the region of the substrate covered by the ITO grating. The measured effective refractive indices of the TE modes were 1.5671, 1.5604, 1.5491, 1.5335 and 1.5135. The measured effective refractive indices of the TM modes were 1.5660, 1.5590, 1.5476, 1.5318 and 1.5112. The effective refractive indices can be converted to propagation constants by multiplying by the wavenumber of the light beam in free space ($\omega/c$, where $\omega$ is the angular frequency of light and c is its speed).

A 1064 nm beam of a diode pumped YAG laser was guided in film. The guided beam was not significantly attenuated as it passed through the region of the Pyrex TM substrate covered with thin ITO. The measured effective refractive indices of the TE modes are 1.5267, 1.5013 and 1.4634. The measured effective refractive indices of the TM modes were 1.5262, 1.5005 and 1.4631.

The difference in the effective refractive indices of the lowest order TM modes at 514.5 nm and 1064 nm was 0.0398. This corresponded to a coherence length ($l_c$) of 6.68 μm. Based on this coherence length and the ITO grating constant the $TM_o$ mode of a 1064 nm guided beam was quasi-phase matched to the $TM_o$ mode of a 532 nm beam when the beams were oriented at an angle of 29.7 degrees with respect to the direction of the grating.

The invention has been described in detail with particular reference to preferred embodiments thereof, but it will be understood that variations and modifications can be effected within the spirit and scope of the invention.

What is claimed is:

1. A quasi-phase matching optical waveguide for producing a second harmonic of an internally propagated polarized laser beam having a wavelength in the range of from 700 to 1300 nm comprised of
    means for providing at least a first array of electrodes with next adjacent electrodes being laterally spaced in the direction of propagation of the laser beam and
    organic layer means for propagating the laser beam containing organic molecular dipoles exhibiting a first polar alignment in areas overlying the electrodes of the first array to provide a second order polarization susceptibility in excess of $10^{-9}$ electrostatic units,
    characterized in that
        the electrodes of the first array are in direct contact with the organic layer means and are chosen to exhibit a refractive index with an imaginary component of less than 0.1 and a conductivity at least 5 orders of magnitude higher than that of the organic layer means and
        the electrodes of the first array and the areas of the organic layer means exhibiting the first polar alignment each have the same width and spacing.

2. A quasi-phase matching optical waveguide according to claim 1 further characterized in that the organic layer means has a resistivity of at least $10^{12}$ ohm-cm and the electrodes have a conductivity that is at least 10 orders of magnitude higher than that of the organic layer means.

3. A quasi-phase matching optical waveguide according to claim 1 in which the electrodes have a resistivity of less than $1 \times 10^{-2}$ ohm-cm.

4. A quasi-phase matching optical waveguide according to claim 1 in which the electrodes of the first array are comprised of a conductive organic polymer.

5. A quasi-phase matching optical waveguide according to claim 1 in which the electrodes of the first array are comprised of a conductive metal oxide.

6. A quasi-phase matching optical waveguide according to claim 1 in which the electrodes of the first array have a thickness of less than 200 Å and are comprised of indium tin oxide.

7. A quasi-phase matching optical waveguide according to claim 6 in which the electrodes of the first array are in the range of from less than 150 Å to 25 Å in thickness.

8. A quasi-phase matching optical waveguide according to claim 1 further characterized in that the means for providing the first array includes a support having a portion transparent to the laser beam and its second harmonic lying in direct contact with the electrodes of the first array and the organic layer means.

9. A quasi-phase matching optical waveguide according to claim 1 further characterized in that the means for providing the first array includes a support having a portion transparent to the laser beam and its second harmonic, a continuous conductive layer coated on the transparent portion of the support, and a dielectric layer transparent to the laser beam and its second harmonic coated on the conductive layer in segments confined to areas other than the areas of the organic layer means exhibiting the first polar alignment, the dielectric layer segments and the continuous conductive layer both directly contacting the organic layer means and together forming the spaced electrodes.

10. A quasi-phase matching optical waveguide according to claim 1 further characterized in that
    the means for providing at least the first array additionally includes means for providing a second array of electrodes with the electrodes of the second array being positioned between and electrically isolated from adjacent electrodes of the first array,
    the organic layer means contains second areas overlying the electrodes of the second array in which the organic molecular dipoles exhibit a second polar alignment oriented opposite that of the first polar alignment, and
    the electrodes of the first and second arrays and the areas of the organic layer means exhibiting the first and second polar alignments each having an identical width and spacing.

11. A quasi-phase matching optical waveguide according to claim 10 in which the means for providing the first and second arrays are comprised of a support, a continuous conductive layer located on the support, and a layer transparent to the laser beam and its second harmonic and having a refractive index less than that of the organic layer means overlying the continuous conductive layer and separating the continuous conductive layer from the electrodes of the first array.

* * * * *